United States Patent
Bifulco et al.

(10) Patent No.: US 9,660,934 B2
(45) Date of Patent: May 23, 2017

(54) METHOD AND SYSTEM FOR HANDLING SUBSCRIBERS' NETWORK TRAFFIC

(71) Applicant: NEC EUROPE LTD., Heidelberg (DE)

(72) Inventors: Roberto Bifulco, Heidelberg (DE); Hans-Joerg Kolbe, Darmstadt (DE)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 14/436,122

(22) PCT Filed: Oct. 18, 2013

(86) PCT No.: PCT/EP2013/071868
§ 371 (c)(1),
(2) Date: Apr. 16, 2015

(87) PCT Pub. No.: WO2014/060589
PCT Pub. Date: Apr. 24, 2014

(65) Prior Publication Data
US 2015/0263989 A1     Sep. 17, 2015

(30) Foreign Application Priority Data
Oct. 18, 2012 (EP) .................................... 12189093

(51) Int. Cl.
*H04L 12/911* (2013.01)
*H04L 12/28* (2006.01)
(Continued)

(52) U.S. Cl.
CPC ........ *H04L 47/825* (2013.01); *H04L 12/2876* (2013.01); *H04L 12/4633* (2013.01);
(Continued)

(58) Field of Classification Search
CPC ........ H04L 12/2869–12/2876; H04L 12/4633; H04L 47/825; H04L 61/2592
See application file for complete search history.

(56) References Cited

U.S. PATENT DOCUMENTS

| 7,646,713 | B1 | 1/2010 | Absillis et al. |
| 2010/0039956 | A1* | 2/2010 | Zheng ................ H04L 61/2015 370/252 |

(Continued)

FOREIGN PATENT DOCUMENTS

EP     2403186 A1     1/2012

OTHER PUBLICATIONS

TR-124 Functional Requirements for Broadband Residential Gateway Devices, Issue 3, broadband forum Technical Report, Aug. 2012, pp. 1-140.

(Continued)

*Primary Examiner* — Pao Sinkantarakorn
(74) *Attorney, Agent, or Firm* — Leydig, Voit & Mayer, Ltd.

(57) ABSTRACT

A method for handling subscribers' network traffic between a CPE (customer premises equipment) and a broadband access network includes establishing a subscriber session between the CPE and a BNG (broadband network gateway, an entity within the broadband access network), to set up a network route between the CPE and the BNG. Data transmitted within the subscriber session are encapsulated into protocol frames. A NCE (network control entity) acquires a state of the subscriber session and updates network policies in at least one network entity on the network route based on the state of the subscriber session. A DEM (dynamic encapsulation module) decides, based on a DEM configuration, whether data sent to the broadband access network are encapsulated data within the subscriber session or are non-encapsulated data outside the subscriber session. The data are transmitted on a part of the network route and are handled according to the network policies.

19 Claims, 5 Drawing Sheets

(51) Int. Cl.
*H04L 12/24* (2006.01)
*H04L 29/06* (2006.01)
*H04L 12/46* (2006.01)
*H04L 12/723* (2013.01)
*H04L 29/12* (2006.01)

(52) U.S. Cl.
CPC .......... *H04L 41/0893* (2013.01); *H04L 45/50* (2013.01); *H04L 61/2592* (2013.01); *H04L 69/14* (2013.01)

(56) References Cited

U.S. PATENT DOCUMENTS

| | | | |
|---|---|---|---|
| 2010/0226379 A1* | 9/2010 | Sun | H04L 41/0893 370/400 |
| 2011/0283344 A1* | 11/2011 | Krishnan | H04L 63/08 726/5 |
| 2012/0082073 A1 | 4/2012 | Andreasen et al. | |

OTHER PUBLICATIONS

TR-101 Migration to Ethernet-Based Broadband Aggregation, Issue 2, broadband forum Technical Report, Jul. 2011, pp. 1-101.

\* cited by examiner

State of the art

METHOD AND SYSTEM FOR HANDLING SUBSCRIBERS' NETWORK TRAFFIC

CROSS-REFERENCE TO PRIOR APPLICATIONS

This application is a U.S. National Phase application under 35 U.S.C. §371 of International Application No. PCT/EP2013071868, filed on Oct. 18, 2013, and claims benefit to European Patent Application No. EP 12189093.3, filed on Oct. 18, 2012. The International Application was published in English on Apr. 24, 2014 as WO 2014060589 under PCT Article 21(2).

FIELD

The present invention relates to methods and systems for handling subscribers' network traffic between a customer premises equipment and a broadband access network.

BACKGROUND

To provide broadband network access to subscribers, operators need to solve
  (i) the technical issues related to the provisioning of the network connection to the subscriber premises, and
  (ii) the technical issues related to the process of Authentication, Accounting and Authorization (AAA) of the subscribers.

Several solutions have been developed to this aim, with the use of tunneling being the most prominent. In particular, DSL access lines use the Point-to-Point Protocol (PPP) to establish a tunnel between a Customer Premises Equipment (CPE) and the operator's Broadband Network Gateway (BNG), which is the point where the operator performs AAA.

In order to obtain network connectivity, a subscriber establishes a PPP session in first place. The PPP session between the subscriber and the BNG provides several functions:
  subscriber authentication, session establishment and session maintenance (i.e., if the subscriber session is alive or not)
  IP address assignment including further options to configure network access of the client
  subscriber traffic isolation through tunneling
  subscriber policies enforcement (authorization)
  session-based accounting
  server discovery, automatic reconnect.

The CPE is in charge of performing the PPP session establishment and subsequent network traffic encapsulation (i.e., it puts subscriber's packets into PPP frames).

The BNG is the termination point of the PPP session, so it is in charge of:
  providing Authentication, Authorization and Accounting (AAA)
  terminate the PPP sessions, i.e. de-capsulation of network packets so that they can be delivered to services (that are unaware of PPP)

Terminating the PPP sessions at BNG enables operators to correctly apply policies on the subscribers' network traffic. Nevertheless, it introduces a hard constraint on the service provisioning architecture, since the subscribers' traffic can flow to services only after the PPP session termination, i.e., all the network traffic coming from a subscriber has to pass through the BNG server.

As network packets coming from or destined to the CPE are encapsulated into the PPP tunnel when traversing the network segment between CPE and BNG, there are certain constraints on the applicability of several network technologies that rely on IP forwarding mechanisms, which are hidden by the use of the PPP tunnel. E.g. multicast functions of the IP protocol are not applicable in the network segment between the CPE and the BNG, forcing the operators in applying complex and inefficient solutions to provide such feature.

Another drawback resides in the implementation of the BNG server itself. In fact, this server has to provide several functions (PPP session termination, policies application, traffic forwarding, etc.) in a centralized way. The BNG server, hence, is a really complex system in charge of providing many critical services (for the subscribers it is serving), and represent a single point of failure in the access network.

Additionally, the requirement of locating all services after the BNG prevents providing service breakout before the termination point, i.e. the BNG.

Some systems known in the art (based on PPP or other session based protocols) try to solve some of these issues. One solution is provided by TR-101 Issue 2 (see http:www.broadband-forum.org/technical/download/TR-101_Issue-2.pdf). In order to support multicast (e.g. for IPTV services), the CPE must be able to support at the same time PPP encapsulated traffic and plain IP traffic over the same WAN interface. A PPP session is established and all the network traffic flows through this session, with the exception of multicast traffic. A VLAN (Virtual Local Area Network) connects directly the CPE with the BNG. To support efficiently multicast, the multicast traffic is sent from the BNG to the DSLAM (Digital Subscriber Line Access Multiplexer) over a dedicated Multicast-VLAN, so that the DSLAM can separate the multicast flows, and send them to the CPE using plain IP.

Hence, the downstream multicast traffic to the CPE is sent over IP. The CPE is able to send plain IP in the upstream direction (towards the DSLAM) as well, i.e. to send IGMP (Internet Group Multicast Protocol) "joins". Such messages, anyway, are sent with source IP address set to "0.0.0.0".

However, this approach is restricted to IGMP traffic. It is not possible to flexibly define breakouts for the network traffic. Additionally, the traffic has to be handled by "multicast-architecture-aware devices" (DSLAMBNG).

Another approach is provided by TR-124 issue 3 (see http:www.broadband-forum.org/technical/download/TR-124_Issue-3.pdf). TR-124 issue 3 describes support for the handling of multiple sessions with mixed use of PPP packets and plain IP packets. This technique allows flexible traffic handling. However, management of the multiple sessions is complex.

In mobile networks, LIPA and SIPTO provide another approach. Local IP Access (LIPA) and Selected IP Traffic Offload architectures (SIPTO) use the concept of separated network flows for subscribers' session management and selected services access. LIPA is a traffic offload solution towards a local network, while SIPTO can be used to offload traffic to the global Internet as well. Both solutions can be applied in two different ways:
  Dedicated offload PDN connection: The User Equipment (UE) is enabled at handling more than one PDN (Packet Data Network) connection at the same time. A dedicated PDN connection is used for handling LIPA-SIPTO traffic. The UE establishes a second session (e.g. it gets a second IP address) to handle the offload network traffic. It is an essential drawback of this solution that is requires multiple sessions.

NAT based solution: This solution uses a single PDN connection and NAT functions installed in the operator controlled equipment (see FIG. 5), e.g. HeNB (Home E-UTRAN NodeB) or L-PGW (Local PDN Gateway). The UE establishes a session via an S-GW (Serving Gateway) with a P-GW (PDN Gateway) using a GTP (Generic Transport Protocol) tunnel.

The UE is configured with a single subscriber session using a single subscriber session and a single IP address. When a network flow should be offloaded, the HeNB (or the L-PGW) sends it out as plain IP. Since the IP address assigned through the subscriber's session to the UE belongs to the mobile network domain, it is not routable in the local network where the HeNB [L-PGW] is located. Hence, the HeNB [L-PGW] performs a source NAT (Network Address Translation) in order to properly forward traffic toward the global Internet.

A drawback of this approach is the requirement of a NAT which make in-network subscriber identification complicated and involves checking of NAT tables. Furthermore, this approach refers to the routing of packets to the (uncontrolled) global internet, i.e., it still requires the use of the broadband access network to deliver the packets to the global internet. As stated earlier, it means that network packets are encapsulated in, e.g. a PPP subscriber session, which involves the limitations and issues discussed earlier.

SUMMARY

A method for handling subscribers' network traffic between a CPE (customer premises equipment) and a broadband access network includes establishing a subscriber session between the CPE and a BNG (broadband network gateway, an entity within the broadband access network), to set up a network route between the CPE and the BNG. Data transmitted within the subscriber session are encapsulated into protocol frames. A NCE (network control entity) acquires a state of the subscriber session and updates network policies in at least one network entity on the network route based on the state of the subscriber session. A DEM (dynamic encapsulation module) decides, based on a DEM configuration, whether data sent to the broadband access network are encapsulated data within the subscriber session or are non-encapsulated data outside the subscriber session. The data are transmitted on a part of the network route and are handled according to the network policies.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
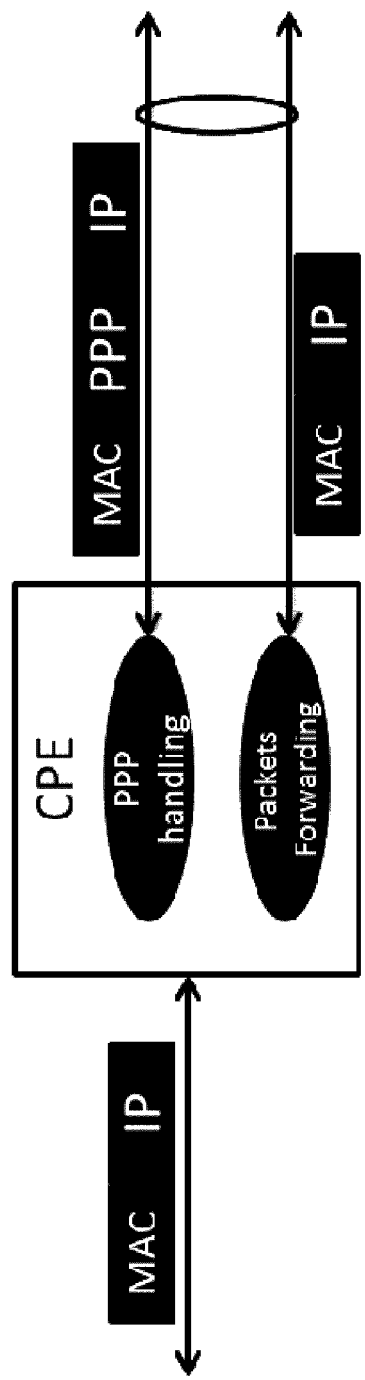
FIG. 1 shows a block diagram which shows the logical functions of the CPE with reference to PPP.

In an embodiment, the present invention provides a method and a system which provides the ability to flexibly and preferable dynamically handle subscriber traffic.

In an embodiment, the present invention also provides a method and a system which allows flexible enforcement of network policies in the access network.

In an embodiment, the present invention further provides a method and a system which enables flexible definition of breakout point.

According to an embodiment of the present invention, a method comprises the steps of:

establishing a subscriber session between said CPE and a broadband network gateway (BNG), thus setting up a network route between said CPE and said BNG, said BNG being an entity within said broadband access network, wherein data transmitted at said subscriber session being encapsulated into protocol frames, acquiring the state of said subscriber session by a network control entity (NCE), updating network policies in at least one network entity on said network route by said NCE based on said state of said subscriber session, deciding, by a dynamic encapsulation module (DEM), based on DEM configuration, whether data is sent to said broadband access network as encapsulated data within said subscriber session or as non-encapsulated data outside said subscriber session, and transmitting said encapsulated and/or said non-encapsulated data on at least a part of said network route, wherein said encapsulated data and said non-encapsulated data being handled according to said network policies.

According to an embodiment of the present invention, a system comprises:

a broadband network gateway (BNG), said BNG being configured to establish a subscriber session with said CPE and to de-capsulate encapsulated data received via said subscriber session, network entities, said network entities being interconnected to each other and providing a network route for data transmitted at said subscriber session, a network controller entity (NCE), said NCE being configured to acquire the state of said subscriber session and to update network policies in at least one of said network entities, a dynamic encapsulation module (DEM), said DEM being configured to decide, whether data is sent to said broadband access network as encapsulated data within said subscriber session or as non-encapsulated data outside said subscriber session, wherein said encapsulated and/or said non-encapsulated data is transmitted on at least a part of said network route, wherein said encapsulated data and said non-encapsulated data being handled according to said network policies.

The term "broadband access network" should be understood in the most general sense: The broadband access network connects a subscriber to a service provider and provides high-speed access to services. Generally, it is implemented as wired network and might contain wireless connections. The broadband access network connects the customer premises equipment with the service provider's core network. Although the "borders" of the access network are not well defined, a skilled person will understand the concept of the broadband access network as used at the present invention.

The term "customer premises equipment" (CPE) should be understood in the most general sense: It refers to the device or devices which isare used at the premises of the subscriber. It might include a gateway, switch, access point and other entities for exchanging data within the customer premises.

The term "broadband network gateway" (BGN) should also be understood in the most general sense: It is part of the broadband access network and provides a termination point for the subscriber session. Although the BNG is very often used at DSL (Digital Subscriber Line) systems, the invention is not limited to this usage.

The terms "subscriber" and "subscriber session" should also be understood in the most general sense: A subscriber is a person (or device) who (or which) accesses the broadband access network. To this end, the subscriber establishes a subscriber session, i.e. a network route between the CPE and the BGN is set up. This generally includes exchanging address information, allocating or reserving resources, defining, how the traffic on the route should be handled, and the like. Very often, the session has to be kept alive, i.e. the session will be terminated, if no data are transmitted or if no keep-alive messages are sent to the BGN.

When establishing a subscriber session, a suitable protocol is used. When transmitting data during a subscriber session, the data is encapsulated into protocol frames. This generally includes putting the data into the payload of frames with header information specific for the used protocol. Sometimes the payload is also encrypted.

According to an embodiment of the present invention, it has first been recognized that it is not necessary to encapsulate all data, which should be exchanged between a customer premises equipment (CPE) and a broadband access network, into protocol frames. In fact, both encapsulated traffic and non-encapsulated traffic can be used. It has further been recognized that transmitting non-encapsulated data does not inevitably result in the loss of secure and reliable network traffic handling. By incorporating a new entity, the operator can keep control of the transmitted traffic. To this end, a network control entity (NCE) is provided which receives information regarding the state of the subscriber session the session state. Basic session states may be "alive", "not alive" or "idle". This information is used when transmitting non-encapsulated traffic.

In a first step, a subscriber session between the CPE and a broadband network gateway (BNG) is established, where the BNG is an entity within the broadband access network. When establishing a subscriber session, a network route between the CPE and the BNG is set up. This includes exchanging network configuration data, which may include IP addresses, quality of service (QoS) data, encryption parameter, etc. Generally, this step also includes authentication of the subscriber which may be performed by providing a user-password combination. Traffic which is transmitted during and within a subscriber session is encapsulated into protocol frames. This step is similar to "traditional" approaches.

In a second step, the state of the subscriber session is acquired by a network control entity (NCE). By doing so, knowledge about the session state is also available at an entity different to the BNG. Thus, the session state information can be moved from a centralized point (the BNG) to the whole access network.

In a third step, the NCE updates network policies in at least one network entity which is participated on transporting a data packet in the network route. Updating network policies may include installing network policies in the network entity when setting up the network route. In this case, the updating process may concern each of the network entities on the network route, but installing network policies may also be limited to selected network entities.

However, the updating process may also include dynamic rerouting of network flows according to subscriber's required services and policies. In this case, the updating process will most likely concern a single network entity.

The step of updating network policies is performed based on the acquired session state. Depending on the session state, policies may allow transmitting encapsulated and/or non-encapsulated network traffic or may grant certain quality of service. If the subscriber session is no longer alive, policies may deny transmitting encapsulated and non-encapsulated network traffic.

In a fourth step, a dynamic encapsulation module (DEM) decides, whether data is sent by the CPE to the broadband access network as encapsulated data within the subscriber session or a non-encapsulated data outside the subscriber session. The decision will be based on DEM configuration. The encapsulation process can range from encapsulating almost all the network packets into a protocol frame, to using encapsulation only for subscriber session related network packets, e.g. keep-alive messages, and using no encapsulation for any other packet. In the last case, the encapsulated traffic has the only aim of maintaining the subscriber session with the BNG.

The encapsulation decision may be based on various conditions. For instance, the necessity of a breakout or offload point between the CPE and the BNG may result in a decision of using non-encapsulated traffic, as non-encapsulated traffic has not to pass the BNG in order to decapsulate the data. "Breakout" of "offload" point refers to a point within the broadband access network, where the network packets leave the "general" network route. In the present case, the breakout point may be point outside the network route between the CPE and the BNG, where the (non-encapsulated) data are available.

In a next step, the data is sent towards the broadband access network based on the encapsulation decision, i.e. as encapsulated data or as non-encapsulated data. When forwarding the data on the network route both encapsulated data and non-encapsulated data are handled according to the network policies installed in the network entities.

In the method and the system according to embodiments of the present invention, non-encapsulated traffic can be exchanged between the CPE and the broadband access network and can be handled with the same network rules like the encapsulated traffic. This allows for controlling the network traffic within the broadband access network and allows for providing breakout points between CPE and BNG in an efficient and flexible way. At the same time, non-encapsulated traffic is tightly coupled with the subscriber session, as the transmitting is based on the session state. Thus, authentication, accounting and authorization of the subscriber are possible for encapsulated and non-encapsulated traffic.

By introducing the NCE into the system, functions which are located at the BNG can be moved to several components within the operator's broadband access network. Thus a singles point of failure, e.g. the BNG at most PPP systems, can be avoided or the influence of a failure can be reduced.

The embodiments of the present invention may be used in combination with each session based protocol, i.e. where a session is established and has to be kept alive and where data are transported as payload in protocol frames. It may also be applied to IPoE (Internet Protocol over Ethernet). In this case, keep-alive messages may be sent to the BNG while most of the traffic is sent as non-encapsulated traffic which does not have to pass the BNG.

However, in preferred embodiments of the invention, the protocol which is used for encapsulating data is a tunneling protocol. This tunneling protocol may be GTP (Generic Transport Protocol), DSM IP (Dual Stack Mobile IP) or PMIP (Proxy Mobile IP). According to the most preferred embodiment, this tunneling protocol is PPP (Point-to-Point Protocol).

When transmitting encapsulated data, the encapsulated data are preferably transmitted to the BNG and are de-capsulated by the BNG. The de-capsulated data are transmitted within the broadband access network and/or the core network of the operator depending on the provided service. If for instance PPP is used and the data are IP packets, CPE encapsulates the IP packets into PPP frames. The BNG is the session termination point and the data, which are encapsulated within PPP frames, are de-capsulated by the BNG. The de-capsulated IP packets are forwarded according to the header information of the IP packets.

When transmitting non-encapsulated data, the data may be transmitted to the BNG and further into the broadband access network. However, the data may also be transmitted on a part of the network route and may leave the route towards an offload-point. This option may for instance be used for multicast traffic.

As already mentioned, the non-encapsulated traffic is tightly coupled with the subscriber session. This coupling may be implemented in such a way that non-encapsulated data is only forwarded, if the subscriber session is still alive. As the NCE is aware of the session state, the NCE may update the policies within all or some of the network entities on the network route so that the data is not forwarded anymore. It is sufficient that one network entity does not forward the data, e.g. the gateway at the CPE.

According to a first embodiment of the present invention, in acquiring the session state, the NCE may send queries to an authentication server to gather information about the subscriber session. In most cases, an authentication server (generally an AAA (Authentication, Accounting, Authorization) server) is involved at establishing a subscriber session. The NCE may be implemented as an AAA client that sends AAA queries to the AAA server. Such AAA communication is well known in the art. However, the NCE may also directly access the session state information at the AAA server. E.g. the NCE may access the log files or the database of the AAA server. One advantage of this embodiment is that does not require a substantial change to the authentication server or the BNG. However, this solution needs additional intercommunication between the BNG and the AAA server.

According to a second embodiment of the present invention, in acquiring the session state, NCE may sniff answers of the authentication server. When a subscriber session is established, the BNG communicates with an authentication server, e.g. an AAA server, in order to gain information about the right of a subscriber to access the requested service. The NCE may sniff the replies of the AAA server directed to the BNG and may obtain the required information about the subscriber. This approach does not need any direct interaction with the AAA server, as the NCE just evaluates the packets which are exchanged between the BNG and the AAA server.

According to a third embodiment of the present invention, in acquiring the session state, BNG is extended to actively forward changes of the state of subscriber session to the NCE. To this end the BNG may contain an additional module. This functionality may be provided by a NASS (Network Attached Subsystem) which is preferably a subsystem of the BNG. According to this embodiment, changes of the session state are directly forwarded to the NCE which results in high accuracy and reliability of the session state data stored at the NCE.

According to a forth embodiment of the present invention, in acquiring the session state, the NCE may receive the session state via interconnection with any other kind of session state server such as a subscriber portal.

The network route which is set up when establishing the subscriber session is based on a network configuration. Preferably, the network configuration is applied to both data flows (i.e. encapsulated and non-encapsulated data). For example, the IP configuration, particularly the IP address of the CPE, is the same for both encapsulated and non-encapsulated data. This is particularly beneficial regarding the handling of the network packets. Due to the same network configuration and in contrast to some systems known in the art, there is no necessity for source NAT (Network Address Translation) system.

The encapsulation decision at the DEM is based on DEM configuration. According to an embodiment of the present invention, the DEM configuration defines static network provisioning, i.e. encapsulation decision is defined once and the according DEM configuration is kept substantially unchanged. Static provisioning may be implemented by static routes or access lists, which match given packets in order to categorize them, e.g. tagging them, so that they can be then routed according to the specific packet's tag. This embodiment does need very little management and can be used in many systems.

According to an embodiment of the present invention, the DEM configuration defines static network provisioning which can be configured dynamically. That means that "basic settings" of the network are initially defined. However, these basic settings may be refined dynamically. This refining may be based on parameters which are dynamically learnt, such as the number of bytes transferred by a network flow. This option may be implemented using the same approach explained in the previous embodiment, where static routes and access lists are updated dynamically, in response to the mentioned parameters variation, by a process running inside the CPE.

According to an embodiment of the present invention, the DEM configuration is fully dynamic and may be adapted upon request. This embodiment provides a highly flexible encapsulation decision which can be adapted according to current demands. This embodiment may be implemented using a remote policy controller such as an H-RACS (Home-Resource and Admission Control Subsystem), an AAA server using Radius CoA, an OpenFlow controller, etc. The remote policy controller, which can be integrated in the NCE or orchestrated by it, defines the DEM policy according to both static and dynamic parameters retrieved from the access network, e.g., links congestion.

Preferably, the DEM configuration is installed on the DEM (or on the CPE, if DEM is implemented in the CPE) by the NCE. Thus, the operator of the broadband access network can flexibly influence the encapsulation decision. This provides great flexibility when a new breakout point should be installed.

The DEM might be implemented in different ways. At one preferred embodiment of the present invention, the DEM is part of the CPE. This embodiment reduces network communication, when an encapsulation decision should be made. According to another preferred embodiment of the present invention, the DEM is external entity, i.e. an entity within the broadband access network. Thus, reliability can be improved, as the DEM can be implemented as a redundant system or certain backup capabilities can be provided.

Preferably, the DEM works as a policy-based router or switch. It may be implemented using reactive principles, like for example in OpenFlow, i.e. a DEM policy is installed in reaction to the creation of a new network flow. In such an implementation, the OpenFlow controller can be either local, so that it can handle all local network events without requiring an interaction with the systems operating the remaining part of the access network, or a remote OpenFlow controller can be queried upon receipt of an unknown packet. This last option reduces the number of OpenFlow controllers that would need to be deployed in the access network, paying an increase in the control messages related to network events. The two previous options are the extremes of a range of deployment options which are related to the actual size and properties of the access network.

Preferably, the NCE is part of the broadband access network. It may be implemented by a proxy within the broadband access network The NCE may be implemented as a centralized system, i.e. there is one server within the broadband access network which is responsible for each subscriber session which is established within this network.

However, the NCE may also be implemented as a distributed system. Different distribution mechanisms may be used. There may be several independent NCE systems within the broadband access network. When a subscriber session is established, a NCE may be assigned dynamically to this session. Another implementation may be a redundant system, where one primary NCE system is active and one or more further NCE run as redundant systems which store a current set of the data of the primary NCE and which are activated when the primary NCE fails. A skilled person will realize that other distribution mechanisms may be applied as well.

FIG. 1 shows an example of the separation of network traffic into encapsulated traffic and non-encapsulated traffic with reference to PPP. A rectangle in the middle of the figure represents the CPE (Customer Premises Equipment). On the left hand side of the CPE is the LAN (Local Area Network). On the right hand side, the CPE is connected to the broadband access network. Communication within the LAN is based on the MAC (Media Access Control) address and the (local) IP (Internet Protocol) address. According to the invention, communication in the broadband access network is separated into encapsulated and non-encapsulated network traffic. The encapsulated network traffic is based on MAC address, (global) IP address and PPP encapsulation. A dedicated module within the CPE performs PPP encapsulation. The non-encapsulated network traffic is based on MAC address and (global) IP address. For this traffic, the CPE performs packets forwarding.

Like in traditional approaches, the CPE is in charge of establishing and maintaining a PPP session with the BNG, but it is also able of dynamically selecting the network packets that need to be encapsulated into the established PPP session. The non-encapsulated traffic is tightly coupled with the PPP session: The network configuration is applied to both flows, e.g. the CPE IP address is the same for both encapsulated and non-encapsulated packets, and in case the PPP session is closed, the non-encapsulated traffic cannot flow anymore.

Figure 2:
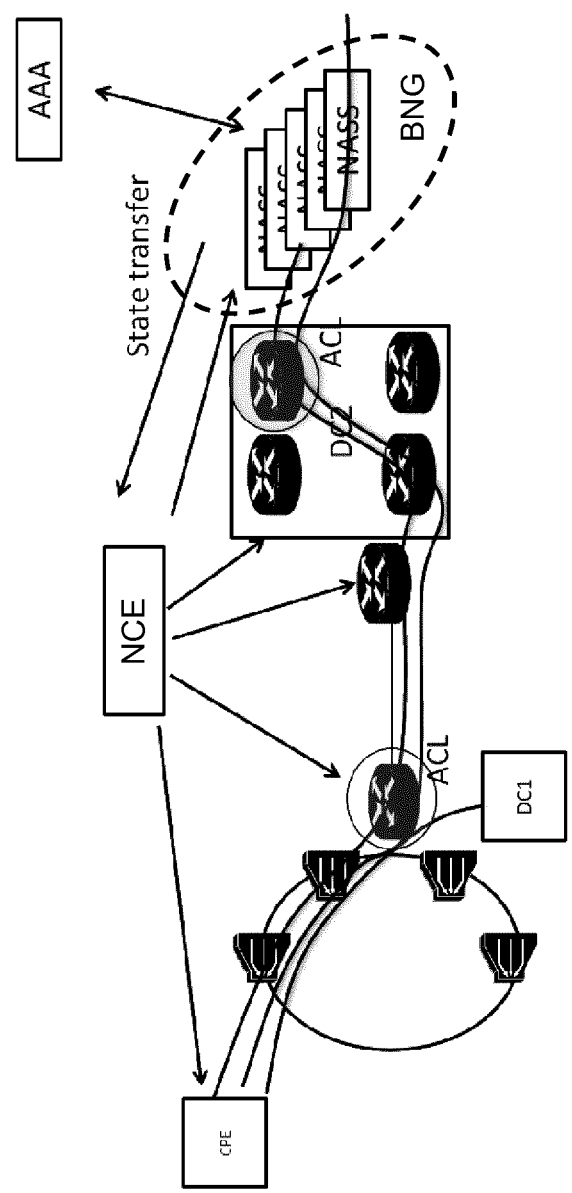
FIG. 2 shows a block diagram of a first embodiment of the invention in a DSL system.

FIG. 2 shows the implementation of this basic concept within a DSL (Digital Subscriber Line) system. The CPE is connected to the broadband access network via a number of DSLAMs (Digital Subscriber Line Access Multiplexer). An ACL (Access Control List) is provided at the first routing point where network flows are separated with the help of advanced PPP handling. Non-encapsulated data are offloaded at a local breakout point DC1. Encapsulated data has to be passed to a BNG where the session is terminated, i.e. the encapsulated data is de-capsulated. In FIG. 2, the BNG is provided by several NASSs (Network Attached SubSystems). The NASSs forward each change of a session state to a centralized NCE (Network Control Entity). The NCE provides some or all of the following functions:

- acquisition of subscribers' state after PPP session establishment;
- set up the correct network routes between the CPE and the BNG. The routes' granularity may vary according to the implemented operator's services. E.g. routes can be defined per subscribers group, subscriber, service, etc.;
- install operator's policies in-network;
- dynamically reroute network flows according to the subscriber's required services and policies;
- providing dynamic traffic breakouts;
- coordinating the CPE PPP encapsulation process with the subscriber network flows routing Acquiring the subscriber state, the NCE is able of deciding the access network routes for subscribers according to their states. Furthermore it is able to install the required policies in a distributed manner in the access network, e.g. exploiting dynamic configuration capabilities of the networking devices and/or using middle-boxes located at strategic locations.

Since the NCE is able to configure the PPP encapsulation process at the CPE, it is able to easily set up services breakout in the access network. I.e. network flows directed to a service are instructed to be not encapsulated at the CPE, so that they can be processed by the service without any need to pass through the PPP session termination point, while specific network routes are installed in the network entities to redirect the flows to the local service breakout. Since the operator's policies are distributed in network, e.g. setting up ACLs in the first routing point, the NCE ensures that the subscriber's network flow passes through network devicesmiddle boxes so that the policies are correctly enforced.

Figure 3:
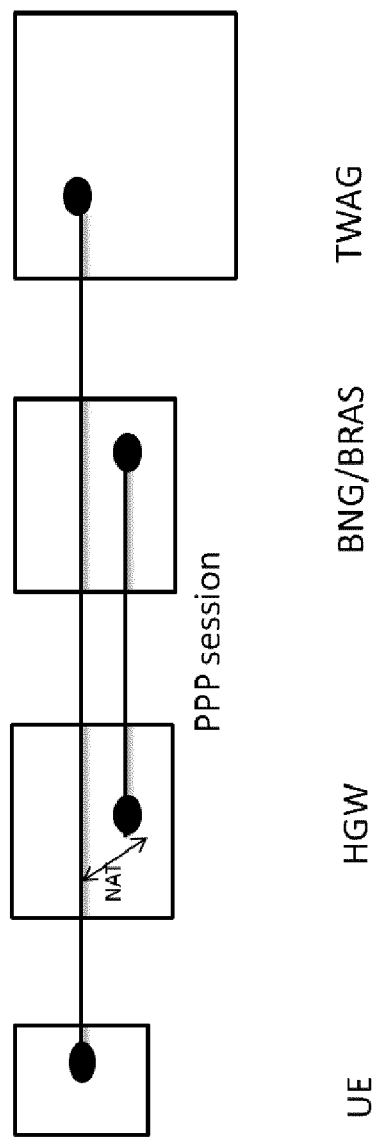
FIG. 3 shows a block diagram of a second embodiment of the invention within a trusted WiFi system.
Figure 4:
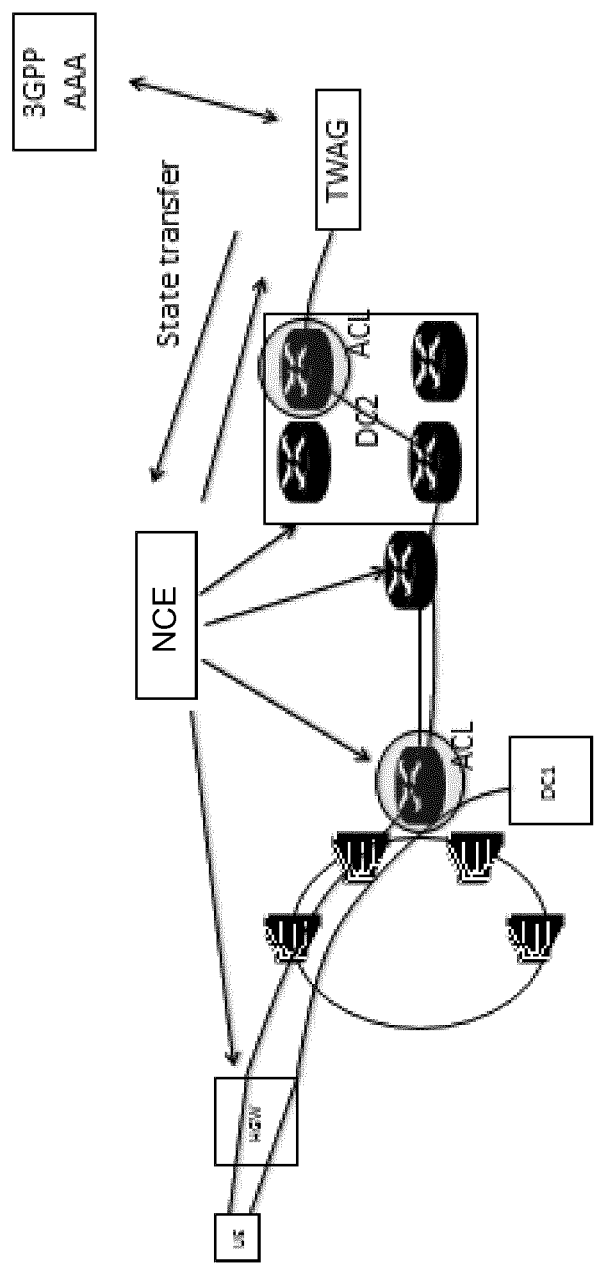
FIG. 4 shows a block diagram of an implementation of the second embodiment.
Figure 5:
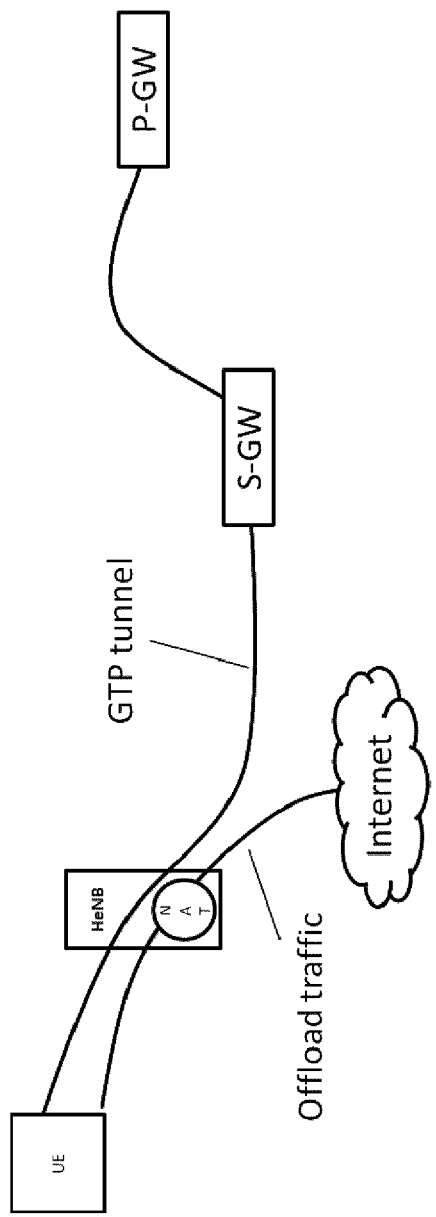
FIG. 5 shows a block diagram of LIPA/SIPTO as known in the art.

Another embodiment of the invention is shown in connection with FIGS. 3 and 4. This embodiment refers to trusted WiFi access to the 3GPP ($3^{rd}$ Generation Partnership Project) via a BBF (Broad Band Forum) network with the need to offload traffic inside the BBF network, the 3GPP UE's (end device) traffic gets tunneled via layer 2 towards an access gateway such as the TWAG (Trusted Wireless LAN Access Gateway). HGW and UE is the CPE of the claims, BNGBRAS (Broadband Remote Access Server) is the BNG.

According to an embodiment of the present invention, such a session could be coupled to an existing PPP session from the CPE's access session to create a combined path management such as e.g. for resource control.

More advanced use can be made, if the access session of the WiFi terminal UE gets coupled with a new un-tunneled session inside the fixed network: In one embodiment of the present invention, the subscriber session between the UE and TWAG uses a tunneling protocol. Then, a plain IP session can be coupled to the session. In another embodiment of the present invention, there is no tunneling protocol between the UE's IP and Ethernet layer. In that case, the sessions get separated at the breakout point (e.g. at DC1 in FIG. 4). In both cases the TWAG transfer session state to the controller.

It could also be the case that Layer 2 headers such as VLAN headers separate both sessions (one towards the 3GPP network, another one for local traffic). Then again the invention applies.

The embodiments of the present invention provide several advantages:
1) Ability to dynamically select multiple traffic routes per subscriber, per service, without any need to pass through the BNG while maintaining the subscriber session concept.
2) Ability to use non-encapsulated network traffic between CPEs and BNG in order to allow full use of e.g. IP features.
3) Enforcement of network policies in network, instead of having a single point for their application.
4) Using same IP address for each route.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling network traffic of subscribers between a CPE (customer premises equipment) and a broadband access network, the method comprising:
   establishing a subscriber session between the CPE and a BNG (broadband network gateway) within the broadband access network thereby setting up a network route between the CPE and the BNG, wherein data transmitted within the subscriber session is encapsulated into protocol frames;
   acquiring, by an NCE (network control entity), a state of the subscriber session;
   updating, by the NCE based on the state of the subscriber session, network policies for handling of encapsulated data and non-encapsulated data by at least one network entity on the network route;
   performing, by a DEM (dynamic encapsulation module), an encapsulation decision based on a DEM configuration, wherein the encapsulation decision determines whether data to be sent to the broadband access network is to be transmitted as encapsulated data within the subscriber session or as non-encapsulated data outside the subscriber session; and
   transmitting, on at least a part of the network route, the data to be sent to the broadband access network as at least one of encapsulated data within the subscriber session or non-encapsulated data outside the subscriber session,
   wherein an IP address of the CPE is the same for both encapsulated data inside the subscriber session and non-encapsulated data outside the subscriber session.

2. The method according to claim 1, wherein the protocol frames are tunneling protocol frames.

3. The method according to claim 2, wherein the protocol frames are PPP (Point-to-Point Protocol) or GTP (Generic Transport Protocol).

4. The method according to claim 1, wherein the transmitting, on at least a part of the network route, of encapsulated data includes transmitting the encapsulated data to the BNG and de-capsulating, by the BNG, the encapsulated data.

5. The method according to claim 1, wherein the transmitting, on at least a part of the network route, of non-encapsulated data includes transmitting the non-encapsulated data to at least one of the BNG or an offload-point on the part of the network route.

6. The method according to claim 1, wherein the transmitting, on at least a part of the network route, of non-encapsulated data is performed only if the subscriber session is alive.

7. The method according to claim 1, wherein the acquiring a state of the network session includes sending, by the NCE, a query for gathering information about the subscriber session to an authentication server that participated in establishing the subscriber session.

8. The method according to claim 1, wherein the acquiring a state of the network session includes sniffing, by the NCE, answers sent from an authentication server that participated in establishing the subscriber session so as to obtain information about the subscriber session.

9. The method according to claim 1, wherein the acquiring a state of the network session includes forwarding, by a NASS (network attached subsystem), session state information to the NCE.

10. The method according to claim 9, wherein the NASS is a subsystem of the BNG.

11. The method according to claim 1, wherein the network route is based on a network configuration being used in the transmitting, on at least a part of the network route, of encapsulated data and in the transmitting, on at least a part of the network route, of non-encapsulated data.

12. The method according to claim 1, wherein the DEM configuration defines static provisioning of network resources to be adapted based on dynamically learned parameters.

13. The method according to claim 12, wherein the DEM configuration is installed by the NCE.

14. The method according to claim 1, wherein the DEM configuration is defined on request by a remote policy controller.

15. The method according to claim 1, wherein the transmitting, on at least a part of the network route, of non-encapsulated data is performed according to the state of the subscriber session.

16. A system for handling network traffic of subscribers between a CPE (customer premises equipment) and a broadband access network, the system comprising:
 a BNG (broadband network gateway) configured to establish a subscriber session with the CPE and to de-capsulate encapsulated data received via the subscriber session,
 a plurality of network entities interconnected to each other and providing a network route for data transmitted in the subscriber session,
 an NCE (network controller entity) configured to acquire a state of the subscriber session and to update network policies for handling of encapsulated data and non-encapsulated data by at least one of the network entities,
 a DEM (dynamic encapsulation module) configured to perform an encapsulation decision that determines whether data to be sent to the broadband access network is to be transmitted as encapsulated data within the subscriber session or as non-encapsulated data outside the subscriber session,
 wherein the data to be sent to the broadband access network as at least one of encapsulated data or non-encapsulated data are transmitted on at least a part of the network route, and
 wherein an IP address of the CPE is the same for both encapsulated data inside the subscriber session and non-encapsulated data outside the subscriber session.

17. The system according to claim 16, wherein the DEM is a part of the CPE or an entity within the broadband access network.

18. The system according to claim 16, wherein the DEM works as a policy-based router or a policy-based switch, or wherein the DEM is implemented using reactive principles.

19. The system according to claim 16, wherein the NCE is a part of the broadband access network or is implemented as centralized or distributed system.

* * * * *